United States Patent Office 2,945,848
Patented July 19, 1960

2,945,848
AZO DYESTUFFS AND PRODUCTION THEREOF

Francis K. Cole, Woodstock, Ill., assignor to The Quaker Oats Company, Chicago, Ill., a corporation of New Jersey No Drawing. Filed Aug. 20, 1957, Ser. No. 679,138

4 Claims. (Cl. 260—172)

This invention relates to novel azo dyestuffs and a process of producing same.

In accordance with the invention azo dyestuffs are obtained by coupling diazotized compounds with compounds having the formula

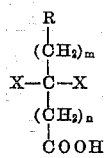

in which R is hydrogen or carboxyl; m is an integer from 0 to 15; n is an integer from 0 to 4; and X is a hydroxy-substituted phenyl or naphthyl radical or derivative thereof having at least one reactive position on the ring.

The primary advantage of the dyestuff of this invention is that it possesses free carboxyl groups and due to this will react with free amino groups. Accordingly the dyestuff is particularly effective in dyeing proteinaceous materials such as wool, silk, nylon, leather and the like.

The compound of the above illustrated formula which is employed as a coupling component in the azo dyestuffs of the invention is formed by reacting one mole of a keto acid with two moles of a phenolic compound. One mole of the resulting bis-phenolic compound is reacted with 1 or 2 moles of a diazotized compound to produce the dyestuffs of this invention.

The keto acid employed is any aliphatic mono-, di- or poly-carboxylic keto acid such as levulinic acid or its lower or higher homologues, for example, pyruvic acid, acetoacetic acid, 4-keto-pimelic acid, oxo-malonic acid, oxalacetic acid, or 2-, 3- or 4-keto-stearic acid.

The phenolic compounds employed include such compounds as phenol, resorcinol, naphthols, cresols, phloroglucinol.

Prior to coupling the bis-phenolic acid to the diazotized compound, the former may be nitrated, aminated or chlorinated.

Suitable diazotized compounds include the diazotized (or tetrazotized) mono- and poly-amines of the benzene, naphthalene, anthracene, diphenyl series including their homologues and their derivatives, for example those substituted by halogen, especially chlorine, nitro, hydroxy, methoxy, carboxylic and/or sulphonic acid groups; diazotized aminoazo compounds may also be employed. Mono-, dis- and polyazo dyestuffs may be prepared according to the present invention; in the case of disazo dystuffs 1 mole of the bis-phenolic coupling component may be reacted with 2 moles of the diazonium salt to give a dystuff such as that illustrated below

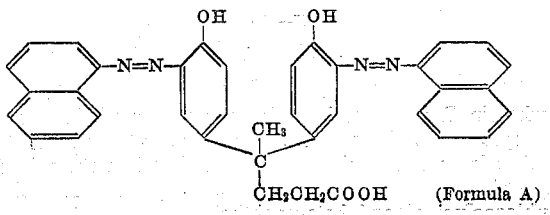

(Formula A)

A particular advantage of the coupling component of this invention is the fact that the two phenyl groups (X and Y) are separated by two saturated carbon to carbon bonds. This grouping serves as a blocking group breaking the chain of conjugation. This makes it possible to couple a suitable diazonium compound on one phenyl group producing a given primary color. Coupling of a dissimilar diazonium compound on the other phenyl group to produce a different primary color for that part of the molecule results in the complementary color derived from the two primaries. Thus 1 mole of aniline when diazotized and coupled with 1 mole of 4,4-bis-(p-hydroxyphenyl)-valeric acid gives a yellow dye. When one mole of the blue dyestuff resulting from coupling beta-naphthol with diazotized dianisidine is coupled to the remaining functional group of the coupling component the resulting dye produces a green color (on wool). This is illustrated in Example 7 below. By this blocking action the coupling component of this invention greatly extends the range of colors and shades which can be obtained from this group of dyestuffs.

The invention will be further illustrated but is not limited by the following examples in which the quantities are stated in parts by weight unless otherwise indicated:

Example 1

The bis-phenolic acid, 4,4-bis-(p-hydroxyphenyl)-valeric acid, is prepared as described in Example 3 of British Patent No. 768,206. By that procedure, a mixture consisting of the following:

282 parts of phenol
116 parts of levulinic acid
250 parts of 37% aqueous hydrochloric acid is agitated at around 50° C. for 66 hours. The organic and aqueous layers are separated by decantation and unreacted materials removed by distillation by heating to 180° C. at 32 millimeters pressure, giving 232 parts of the bis-phenolic acid which is purified by recrystallization from water. A solution of the purified bis-phenolic acid is prepared with the following:

100 parts bis-phenolic acid
84 parts sodium hydroxide
1700 parts water
1700 parts ice A diazonium compound is prepared from the following:

99 parts alpha-naphthylamine
1700 parts water
1700 parts ice
150 parts concentrated hydrochloric acid
52 parts sodium nitrite The solution of diazonium compound is added slowly and with stirring to the solution of bis-phenolic acid. A very dark brown solution is formed and is allowed to stand for about 5 minutes. The dye is precipitated out by acidification with dilute sulfuric acid, filtered off by suction and washed on the filter with cold water. After drying overnight in air a dyestuff having the structure shown in Formula A above is obtained in about 95% yield. This dye is soluble in aqueous sodium hydroxide, acetone, methanol, and ethanol and is insoluble in water and benzene. The melting point as determined on a Fisher-Johns apparatus is 101–102° C. The apparent molecular weight is 608 as determined by the Rast method with camphor. The molecular weight as determined by titration with sodium hydroxide is 603. Samples of wool, silk and nylon cloth are dyed a rust-brown by immersing for 5 minutes in a dyebath containing 30 parts of methanol, 100 parts of 4% aqueous sulfuric acid and 0.5–2.0% of the dyestuff based on the weight of cloth to be dyed. The dyed material is rinsed in cold water and then washed with soap and water, rinsed and dried. The resulting material is acid fast, light fast and wash fast.

Similar dyestuffs are obtained by employing chloronaphthylamines instead of alpha-naphthylamine.

Wool dyed rust-brown with the dyestuff of Example 1 is altered in shade by treatment with various metal salts in warm aqueous solution. For example, the following results are obtained with the indicated metal salt:

| Salt: | Color |
|---|---|
| $Cr_2(SO_4)_3$ | Near apricot. |
| $CuSO_4$ | Dull grayish brown. |
| $Fe(NO_3)_3$ | Brown. |
| $K_2Cr_2O_7$ | Brown. |

This effect occurs with any of the dyestuffs derived from bis-phenolic acids having the hydroxyl group ortho to the diazo linkage.

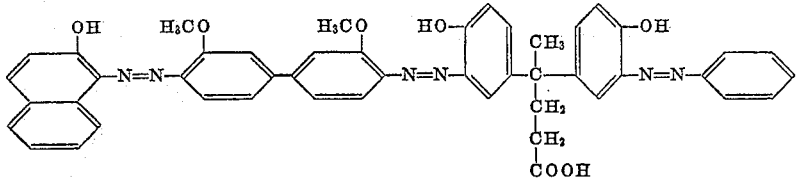

Example 2

The procedure of Example 1 is repeated with the exception that 437 parts of beta-naphthol are substituted for phenol in the preparation of the bis-phenolic acid. The resulting bis-phenolic acid is 4,4-bis-(hydroxynaphthyl)-valeric acid. When one molar proportion is coupled with two molar proportions of alpha-naphthylamine according to the procedure of Example 1, a dyestuff is obtained which dyes wool a brown color.

Example 3

The procedure of Example 1 is repeated with the exception that 333 parts of resorcinol are substituted for the phenol in preparing the bis-phenolic acid. The resulting bis-phenolic acid is 4,4-bis-(o,p-dihydroxyphenyl)-valeric acid. When one molar proportion is coupled with two molar proportions of alpha-naphthylamine according to the procedure of Example 1, a dyestuff is obtained which dyes wool a deep rose color.

Example 4

The procedure of Example 1 is repeated with the exception that 65 parts of aniline are substituted for alpha-naphthylamine in the preparation of the diazonium compound. The dyestuff produced colors wool a clear golden yellow.

Similar dyestuffs are obtained by employing diazotized chloro- or nitro-aniline.

Example 5

The procedure of Example 1 is repeated with the exception that 378 parts of phloroglucinol are substituted for phenol in preparing the bis-phenolic acid. When one molar proportion is coupled with two molar proportions of alpha-naphthylamine according to the procedure of Example 1, a dyestuff is obtained which dyes wool a yellowish-brown.

The yellowish-brown shade is deepened by immersing the dyed wool in a bath of potassium dichromate slightly acidified with sulfuric acid.

Example 6

The procedure of Example 1 is repeated with the exception that the bis-phenolic acid obtained is chlorinated to give 4,4-bis-(dichloro-p-hydroxyphenyl)-valeric acid. The latter acid (148 parts) is then coupled with alpha-naphthylamine according to the procedure of Example 1. The resulting dyestuff dyes wool a salmon pink.

Example 7

The procedure of Example 4 is repeated with the exception that only 32.5 parts of aniline are employed. The resulting yellow dyestuff has the following structure:

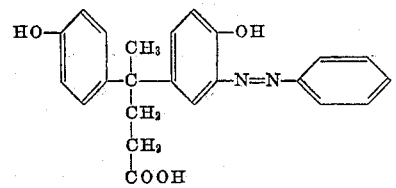

This yellow dyestuff is then reacted (on alkaline side) immediately upon formation with 140 parts of the blue dyestuff resulting from coupling beta-naphthol to diazotized dianisidine. The resulting dyestuff dyes wool a green color and has the following probable structure:

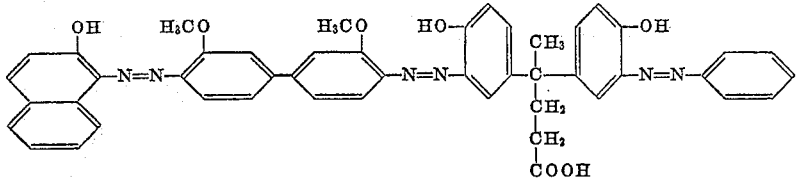

Example 8

The procedure of Example 7 is repeated with the exception that 48 parts of p-nitroaniline are substituted for the blue dyestuff. The resulting dyestuff dyes wool a richer shade of yellow (chrome yellow) than the yellow dyestuff of Example 7. Its structural formula is as follows:

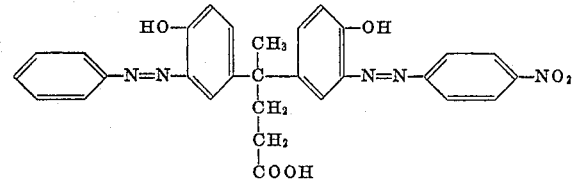

Example 9

The procedure of Example 1 is repeated with the exception that 174 parts of ketopimelic acid are substituted for levulinic acid in the preparation of the bis-phenolic acid. When one molar proportion of this bis-phenolic acid is coupled with two molar proportions of alpha-naphthylamine, a dyestuff is obtained which is similar to that of Example 1.

Example 10

The procedure of Example 1 is repeated with the exception that 298 parts of 4-ketostearic acid are substituted for levulinic acid in the preparation of the bis-phenolic acid. When one molar proportion of the latter is coupled with two molar proportions of alpha-naphthylamine, a dyestuff is obtained which is similar to that of Example 1.

I claim:

1. The azo dye coupling product of a member of the group consisting of diazonium salts of the benzene and naphthalene series with a compound having the formula

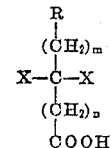

wherein R is a member of the group consisting of hydrogen and carboxyl radicals, $m$ is an integer from 0 to 15, $n$ is an integer from 0 to 4, and X is a radical of a member of the group consisting of phenol, resorcinol, phloroglucinol and beta-naphthol.

2. An azo dye coupling product according to claim 1, wherein R is hydrogen, $m$ is 1, $n$ is 2, and X is p-hydroxyphenyl.

3. An azo dye coupling product according to claim 1, wherein R is hydrogen, $m$ is 1, $n$ is 2, and X is o,p-dihydroxy-phenyl.

4. An azo dye coupling product according to claim 1, wherein R is hydrogen, $m$ is 1, $n$ is 2, and X is 2,4,6-trihydroxyphenyl.

References Cited in the file of this patent

FOREIGN PATENTS

| | | |
|---|---|---|
| 80,816 | Germany | Apr. 15, 1893 |
| 541,195 | Germany | Jan. 13, 1932 |
| 9,182 | Great Britain | 1893 |